(12) United States Patent
Yamamura

(10) Patent No.: US 8,023,205 B2
(45) Date of Patent: Sep. 20, 2011

(54) LENS ARRAY, LIGHT EMITTING DIODE HEAD, EXPOSURE DEVICE, IMAGE FORMING APPARATUS, AND READING APPARATUS

(75) Inventor: Akihiro Yamamura, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 12/697,557

(22) Filed: Feb. 1, 2010

(65) Prior Publication Data

US 2010/0202059 A1 Aug. 12, 2010

(30) Foreign Application Priority Data

Feb. 6, 2009 (JP) ................ 2009-025771

(51) Int. Cl.
*G02B 5/00* (2006.01)
(52) U.S. Cl. ...................... 359/739; 359/738
(58) Field of Classification Search ........... 359/738–740
See application file for complete search history.

(56) References Cited

U.S. PATENT DOCUMENTS

| 5,121,254 A * | 6/1992 | Hamanaka et al. ........... 359/619 |
| 5,648,877 A * | 7/1997 | Schnitzlein .................. 359/739 |
| 6,724,546 B2 * | 4/2004 | Nishimae et al. ............. 359/740 |
| 6,942,349 B2 * | 9/2005 | Inamoto ...................... 353/97 |

FOREIGN PATENT DOCUMENTS

| JP | 2001-290104 | 10/2001 |
| JP | 2008-083576 | 4/2008 |
| JP | 2008-087185 A | 4/2008 |

* cited by examiner

*Primary Examiner* — Darryl J Collins
(74) *Attorney, Agent, or Firm* — Kubotera & Associates, LLC

(57) ABSTRACT

A lens array includes a lens assembly member and a light blocking member. The lens assembly member includes lens elements arranged in an arrangement direction substantially perpendicular to optical axes thereof. The light blocking member includes apertures extending and passing thought the optical axes. The lens assembly members and the light blocking member are arranged so that the following relationship is satisfied:

$$RAY/RLY < RAX/RLX$$

where RLY is a radius of the lens elements in a direction parallel to the arrangement direction, RLX is a radius of the lens elements in a direction perpendicular to the arrangement direction, RAX is a radius of the aperture in a direction perpendicular to the arrangement direction, and RAY is a distance from a center of a circle with the radius RAX to an end portion of the aperture in a direction in parallel to the arrangement direction.

14 Claims, 14 Drawing Sheets

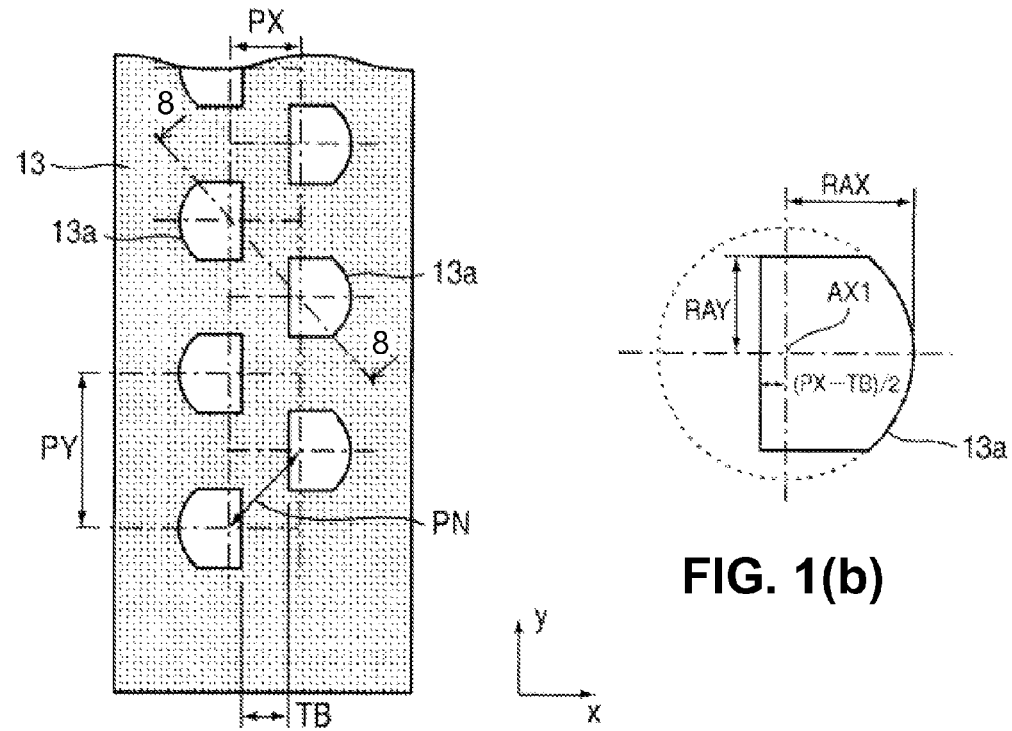
FIG. 1(b)
FIG. 1(a)
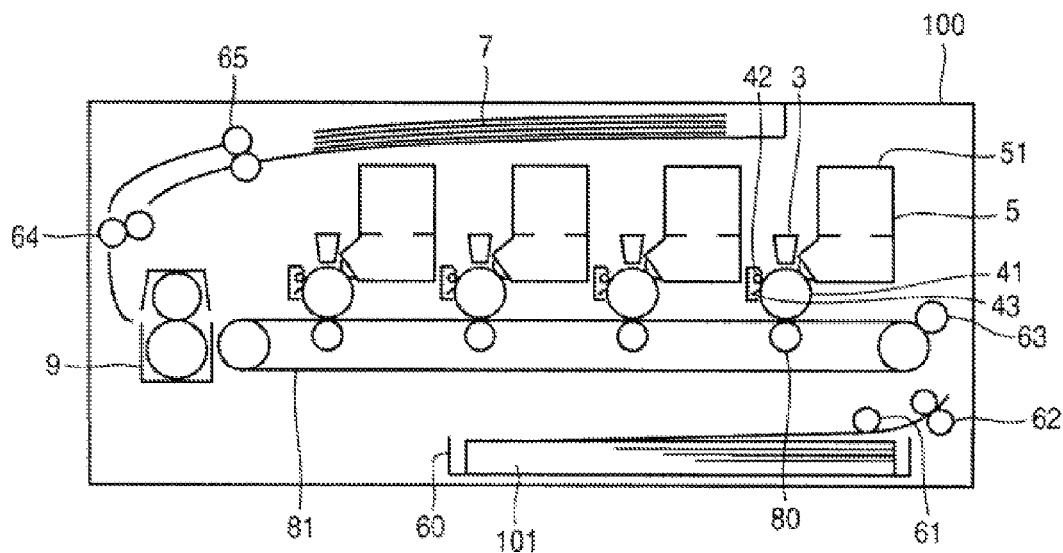
FIG. 2

LENS ARRAY, LIGHT EMITTING DIODE HEAD, EXPOSURE DEVICE, IMAGE FORMING APPARATUS, AND READING APPARATUS

BACKGROUND OF THE INVENTION AND RELATED ART STATEMENT

The present invention relates to a lens array; a light emitting diode (LED) head including the lens array; an exposure device including the lens array; an image forming apparatus including the exposure device; and a reading apparatus including the lens array.

A conventional lens array is used as an optical system capable of forming an erected same-size image of an object, and is arranged in a line arrangement in an image forming apparatus of an electro-photography type or a reading apparatus such as a scanner and a facsimile. The image forming apparatus uses an LED (Light Emitting Diode) head in which a plurality of LEDs is arranged linearly. In the reading apparatus, an image of an original is formed on a light receiving unit formed of a plurality of light receiving elements arranged linearly.

The conventional lens array includes a lens group formed of a plurality of lenses for forming an erected same-size image of an object. The lens groups are arranged substantially linearly, so that the erected same-size image of an object is formed in a linear arrangement. The lenses may be integrally produced through a plastic injection molding, thereby reducing a number of parts (refer to Patent Reference).

Patent Reference: Japanese Patent Publication No. 2008-87185

In the conventional lens array, when light leaks from one of the lenses arranged linearly and is incident on another of the lenses, an image called a ghost, i.e., another image of the object, may be formed on an image plane. When the ghost is formed, an exposure device of the image forming apparatus forms an image with low contrast, thereby deteriorating image quality, or it is difficult for the reading apparatus to accurately obtain image data corresponding to an original.

In view of the problems described above, an object of the present invention is to provide a lens array capable of solving the problems of the conventional lens array and forming an image with high contrast.

Further objects and advantages of the invention will be apparent from the following description of the invention.

SUMMARY OF THE INVENTION

In order to attain the objects described above, according to the present invention, a lens array includes a lens assembly member and a light blocking member. The lens assembly member includes a plurality of lens elements arranged in a row extending in a direction substantially perpendicular to optical axes thereof. The light blocking member includes a plurality of apertures arranged in a direction substantially perpendicular to the optical axes so that the optical axes pass through the apertures.

The lens assembly member and the light blocking member are arranged so that the following relationship is satisfied:

$$RAY/RLY < RAX/RLX$$

where $RLY$ is a radius of the lens elements in a direction parallel to the direction that the lens elements are arranged, $RLX$ is a radius of the lens elements in a direction perpendicular to the direction that the lens elements are arranged, $RAX$ is a radius of the aperture in a direction perpendicular to the direction that the lens elements are arranged, and $RAY$ is a distance from a center of a circle with the radius $RAX$ to an end portion of the aperture in a sixth direction in parallel to the direction that the lens elements are arranged.

As described above, in the present invention, the lens array is capable of forming an image with high contrast.

BRIEF DESCRIPTION OF THE DRAWINGS

FIGS. 1(a) and 1(b) are schematic views showing a light blocking member of a printer according to a first embodiment of the present invention, wherein FIG. 1(a) is a schematic plan view thereof, and FIG. 1(b) is a schematic plan view showing an aperture of the light blocking member;

FIG. 2 is a schematic sectional view showing the printer according to the first embodiment of the present invention;

DETAILED DESCRIPTION OF PREFERRED EMBODIMENTS

Figure 3:
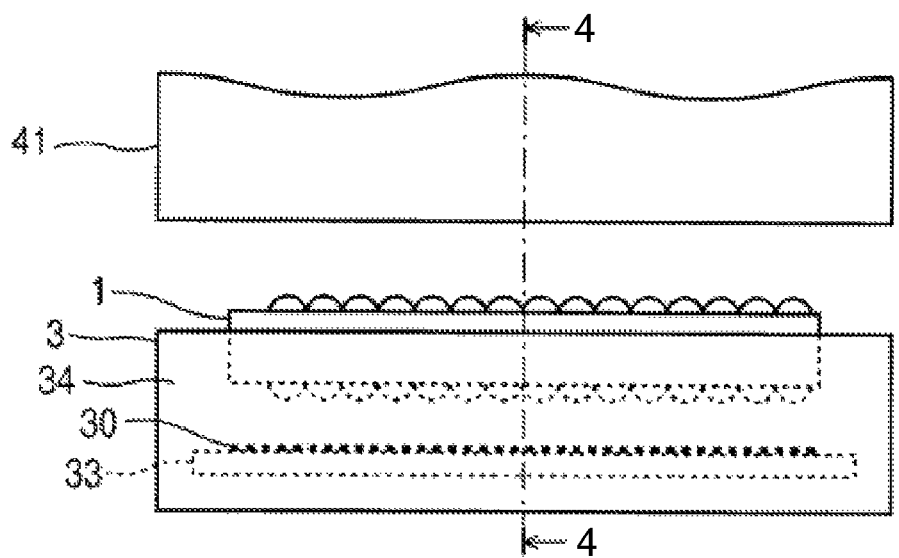
FIG. 3 is a schematic side view showing an LED (Light Emitting Diode) head of the printer according to the first embodiment of the present invention.

Hereunder, preferred embodiments of the present invention will be explained with reference to the accompanying drawings. Similar components in the drawings are designated with the same reference numerals.

First Embodiment

A first embodiment of the present invention will be explained. A printer 100 will be explained as an image forming apparatus with reference to FIG. 2. FIG. 2 is a schematic sectional view showing the printer 100 according to the first embodiment of the present invention.

In the embodiment, the printer 100 forms an image on a printing medium according to image data using toner formed of a resin containing a colorant as a color agent. As shown in FIG. 2, a sheet supply cassette 60 is disposed in the printer 100 for storing a sheet 101. A sheet supply roller 61 is provided for picking up the sheet 101 from the sheet supply cassette 60, and transport rollers 62 and 63 are provided for transporting the sheet 101 picked up from the sheet supply cassette 60.

In the embodiment, the printer 100 is a color printer of an electro-photography type. The printer 100 includes an image forming portion for forming images in colors of yellow, magenta, cyan, and black. The image forming portion is formed of photosensitive drums 41 as a static latent image supporting member; developing devices 5 for developing static latent images formed on the photosensitive drums 41 to form toner images; and toner cartridges 51 for supplying toner to the developing devices 50. The photosensitive drums 41, the developing devices 5, and the toner cartridges 51 are arranged along a transportation path of the sheet 101.

In the embodiment, charging rollers 42 and LED (Light Emitting Diode) heads 3 as optical heads are arranged to face the photosensitive drums 41. The charging rollers 42 are provided for supplying charges to surfaces of the photosensitive drums 41 to charge the same. The LED heads 3 are provided for selectively irradiating the surfaces of the photosensitive drums 41 according to the image data to form the static latent images thereon.

In the embodiment, transfer rollers 80 are disposed to face the photosensitive drums 41 with a transfer belt 81 in between. The transfer rollers 80 are provided for transferring the toner images formed on the photosensitive drums 41 and visualized with toner to the sheet 101. Cleaning blades 43 are arranged to abut against the photosensitive drums 41 for removing toner remaining on the surfaces of the photosensitive drums 41 after the sheet 101 passes through a transfer portion.

In the embodiment, a fixing device 9 is disposed on a downstream side of the transfer portion for fixing the toner images transferred to the sheet 101 through heat and pressure. A transport roller 64 is provided for transporting the sheet 101 after the sheet 101 passes through the fixing device 9. Further, a discharge roller 65 is provided for discharging the sheet 101 to a discharge portion 7 for storing the sheet 101 therein after the sheet 101 is transported with the transport roller 64.

In the embodiment, a power source (not shown) applies a specific voltage to the charging rollers 42 and the transfer rollers 80. A motor (not shown) and a drive transmission gear (not shown) drive the transfer belt 81, the photosensitive drums 41, and each roller to rotate. A power source (not shown) and a control unit (not shown) are connected to the developing devices 5, the LED heads 3, the fixing device 9, and each motor (not shown).

In the embodiment, the printer 100 further includes an external interface (not shown) for receiving the print data from a host device, so that an image is formed on the sheet 101 or the printing medium according to the print data received through the external interface. Further, the printer 100 includes a control unit (not shown) as a control device and a calculation device for storing a control program in a storage unit thereof such as a memory, and for controlling an entire operation of the printer 100 according to the control program.

A configuration of the LED head 3 will be explained next with reference to FIG. 3. FIG. 3 is a schematic side view showing the LED head 3 of the printer 100 according to the first embodiment of the present invention.

As shown in FIG. 3, the LED head 3 is provided with a lens array 1. The lens array 1 is fixed to the LED head 3 with a holder 34. The LED head 3 further includes a plurality of LED elements 30 arranged on a circuit board 33 in a substantially linear arrangement.

In the embodiment, the lens array 1 is formed in an elongated shape, and is arranged in parallel to the LED elements 30 arranged in the substantially linear arrangement. Further, the lens array 1 is arranged in parallel to the photosensitive drum 41 where the static latent image is formed. Further, the lens array 1 includes micro lenses 12 (refer to FIG. 4) having optical axes extending in a vertical direction in FIG. 3.

Figure 4:
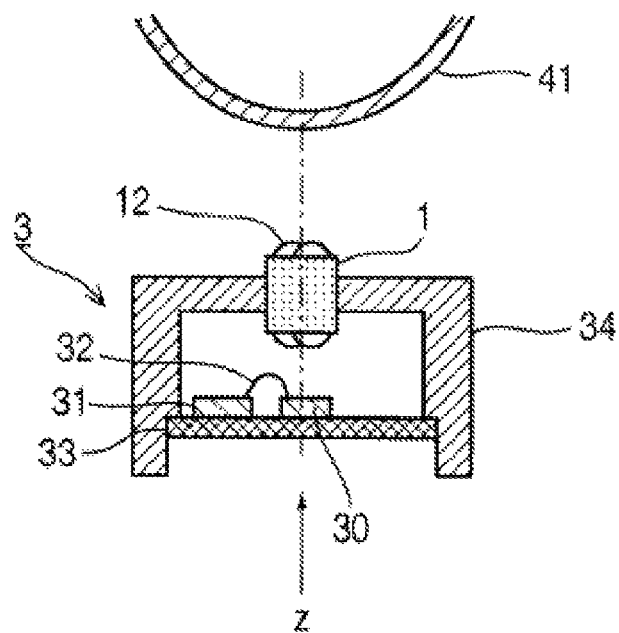
FIG. 4 is a schematic sectional view showing the LED head of the printer taken along a line 4-4 in FIG. 3 according to the first embodiment of the present invention.

FIG. 4 is a schematic sectional view showing the LED head 3 of the printer 100 taken along a line 4-4 in FIG. 3 according to the first embodiment of the present invention. As shown in FIG. 4, the lens array 1 includes the micro lenses 12 having the optical axes extending in a vertical direction in FIG. 4 as well. The LED elements 30 and driver ICs (Integrated Circuits) 32 are mounted on the circuit board 33. The LED elements 30 and the driver ICs 31 are connected through wiring portions 32, so that the driver ICs 31 control the LED elements 30 as light emitting portions to emit light. The LED elements 30 are arranged linearly in one row with a specific interval.

In the embodiment, with the lens array 1, an image of the LED elements 30 is formed on the photosensitive drum 41. When the photosensitive drum 41 rotates and the LED elements 30 emit light, the static latent image is formed on the photosensitive drum 41. The LED head 3 has a resolution of 600 dpi (dot per inch), and 600 of the LED elements 31 are arranged in one inch (=about 25.4 mm). That is, the LED elements 31 are arranged with an interval or a pitch of 0.0423 mm.

Figure 5:
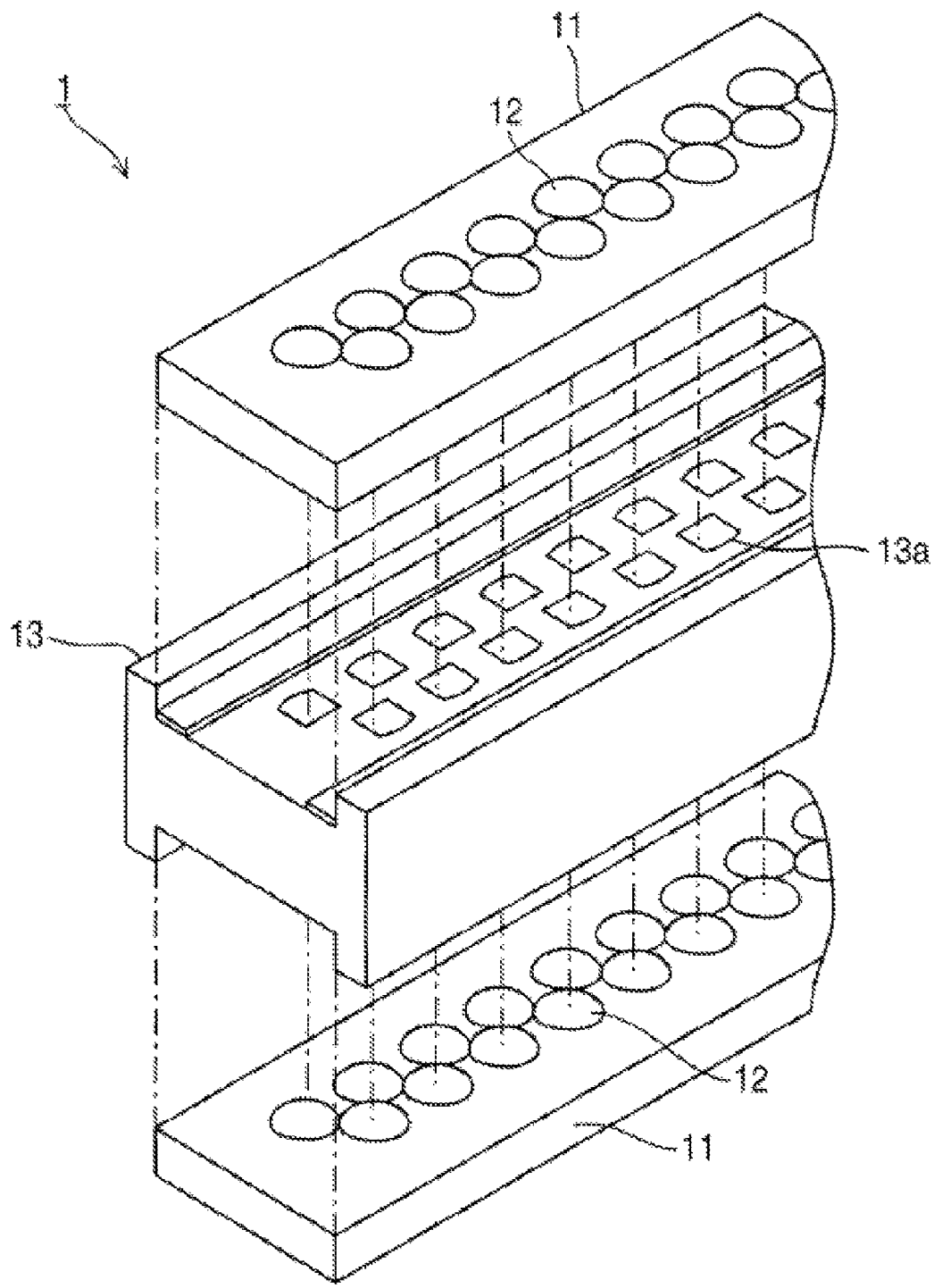
FIG. 5 is a schematic exploded perspective view showing the lens array of the printer according to the first embodiment of the present invention.

A configuration of the lens array 1 will be explained next with reference to FIG. 5. FIG. 5 is a schematic exploded perspective view showing the lens array 1 of the printer 100 according to the first embodiment of the present invention.

As shown in FIG. 5, the lens array 1 includes lens plates 11 as an assembly member of lens elements and a light blocking member 13. The lens plate 11 has a plurality of the micro lenses 12 as the lens elements alternately arranged in two substantially straight lines extending in parallel to each other. Two of the lens plates 21 are arranged to face with each other. The micro lenses 12 of the lens plates 21 are arranged with an identical interval, so that the optical axes of the corresponding micro lenses 12 of the lens plates 21 are aligned with each other. That is, in the lens array 1, the micro lenses 12 as lens groups are arranged in two rows in a direction perpendicular to the optical axes thereof, and the optical axes thereof are aligned with each other. Further, the lens plates 11 are formed of a transparent material, so that light emitted from the LED elements 30 passes through the lens plates 11.

As shown in FIG. 5, the light blocking member 13 includes a plurality of opening portions 13a as apertures formed as through holes at positions corresponding to those of the micro lenses 12 of the lens plates 11. The opening portions 13a are arranged with an interval the same as that of the micro lenses 12 of the lens plates 11. Further, the opening portions 13a are arranged at the positions corresponding to the optical axes of the micro lenses 12 of the lens plates 11. Further, the opening portions 13a are arranged in a direction substantially perpendicular to the optical axes of the micro lenses 12 of the lens plates 11.

Figure 6:
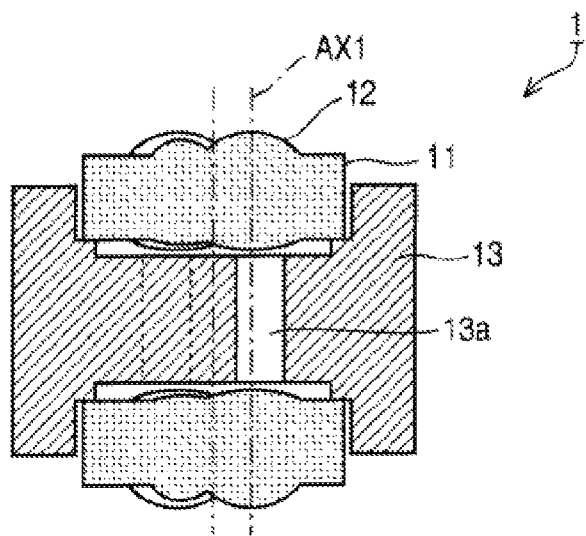
FIG. 6 is a schematic sectional view showing the lens array of the printer according to the first embodiment of the present invention.

FIG. 6 is a schematic sectional view showing the lens array 1 of the printer 100 according to the first embodiment of the present invention. In FIG. 6, the schematic sectional view is taken along a plane perpendicular to the arrangement direction of the micro lenses 12. As shown in FIG. 6, in the lens array 1, the lens plates 11 are arranged such that the optical axis AX1 of the micro lenses 12 are aligned with each other. Further, the light blocking member 13 is arranged such that the opening portions 13a thereof are aligned with the optical axis AX1.

Figure 7:
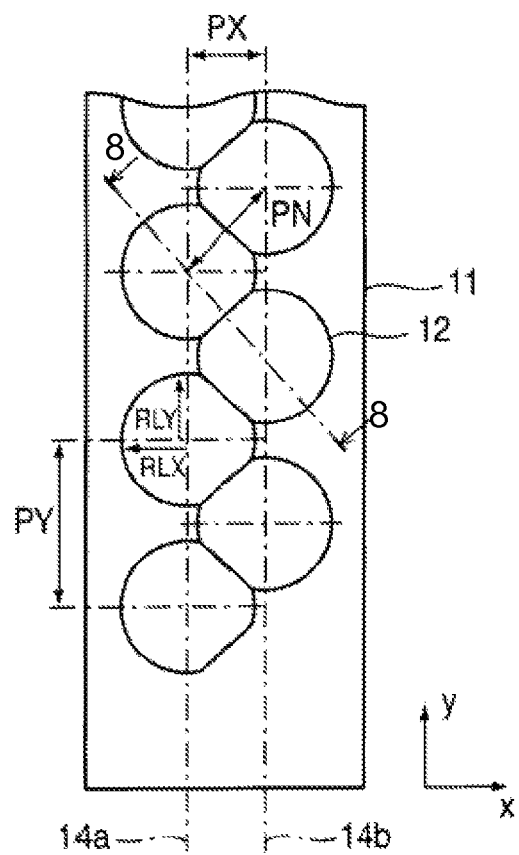
FIG. 7 is a schematic plan view showing the lens array of the printer according to the first embodiment of the present invention.

FIG. 7 is a schematic plan view showing the lens array 1 of the printer 100 according to the first embodiment of the present invention.

As shown in FIG. 7, on the lens plate 11, a plurality of the micro lenses 12 is arranged alternately in two rows extending in parallel on substantially straight lines, so that the micro lenses 12 are arranged on same straight lines to form a first lens row 14a and a second lens row 14b extending in parallel. More specifically, the micro lenses 12 form the first lens row 14a and the second lens row 14b with a specific distance therebetween in a direction perpendicular to the arrangement direction of the micro lenses 12. The micro lenses 12 arranged in the first lens row 14a and the second lens row 14b are separated by a distance PY. The first lens row 14a and the second lens row 14b are separated by a distance PX.

In the embodiment, the first lens row 14a and the second lens row 14b extend in parallel to a straight line on which a plurality of the LED elements 30 (not shown in FIG. 7) is arranged. Further, the first lens row 14a and the second lens row 14b are away by a same distance from the straight line on which a plurality of the LED elements 30 (not shown in FIG. 7) is arranged.

As shown in FIG. 7, one of the micro lenses 12 on the first lens row 14a is arranged adjacent to one of the micro lenses 12 on the second lens row 14b, and is separated by a distance PN. Further, one of the micro lenses 12 on the first lens row 14a arranged adjacent to one of the micro lenses 12 on the second lens row 14b is overlapped with the one of the micro lenses 12 on the second lens row 14b.

As shown in FIG. 7, a boundary between the micro lenses 12 overlapping with each other is in a substantially straight line in a plan view. Each of the micro lenses 12 has a radius RLY in the arrangement direction thereof, and the radius RLY is a distance between the optical axis and an outer circumference of each of the micro lenses 12. Further, each of the micro lenses 12 has a radius RLX perpendicular to the arrangement direction thereof, and the radius RLX is a distance between the optical axis and an outer circumference of each of the micro lenses 12 on an outer side of the lens plate 11.

In the embodiment, the lens plate 11 of the lens array 1 may be formed of an optical resin of a cyclo-olefin type (ZEONEX E48R, a product of Zeon Corporation). It is possible to integrally form a plurality of the micro lenses 12 using the optical resin through an injection molding.

In the embodiment, each of the micro lenses 12 has a rotationally symmetrical high order aspheric surface expressed with the equation (1), thereby making it possible to obtain high resolution.

$$z(r) = \frac{\frac{r^2}{C}}{1 + \sqrt{1 - \left(\frac{r}{C}\right)^2}} + Ar^4 + Br^6 \tag{1}$$

where C is a curvature radius, A is a fourth order aspheric surface coefficient, and B is a sixth order aspheric surface coefficient. In the equation (1), the function z(r) represents a rotational coordinate with a radial coordinate r, in which an axis thereof extends in parallel to the optical axes of the micro lenses 12. In the rotational coordinate, an origin is located at a top of a curved surface of each of the micro lenses 12, and a positive number is assigned in a direction from an object plane of the lens array 1 toward the image plane thereof.

FIGS. 1(a) and 1(b) are schematic views showing the light blocking member 13 of the printer 100 according to the first embodiment of the present invention. More specifically, FIG. 1(a) is a schematic plan view of the light blocking member 13, and FIG. 1(b) is a schematic plan view showing the opening portion 13a of the light blocking member 13.

As shown in FIG. 1(a), the light blocking member 13 includes the opening portions 13a with the interval PY or the distance PY therebetween. The opening portions 13a are arranged in two rows with the interval PX or the distance PX therebetween extending in a direction perpendicular to an arrangement direction of the opening portions 13a. Further, the opening portions 13a are arranged with an interval TB or a distance TB therebetween in a direction perpendicular to the arrangement direction of the micro lenses 12. In the embodiment, the light blocking member 13 is formed of a material blocking light emitted from the LED elements 30.

As shown in FIG. 1(b), the opening portion 13a has a shape having an arc with a radius RAX; a straight line in parallel to the arrangement direction of the opening portions 13a at a position of a half of a difference between the distance PX and the distance TB ((PX−TB)/2); and straight lines perpendicular to the arrangement direction of the opening portions 13a at positions away by the distance RAY from a center of a circle with the radius RAX in the arrangement direction of the opening portions 13a. Further, the opening portion 13a is arranged such that the center of the circle with the radius RAX is aligned with the optical axis AX1 of the micro lenses 12.

In the embodiment, in the light blocking member 13, the straight lines of the opening portions 13a are situated on sides of adjacent opening portions. Further, the arc with the radius RAX of the opening portion 13a is situated on an end portion side in an x direction perpendicular to the arrangement direction of the opening portions 13a of the light blocking member 13 shown in FIG. 1(a).

Figure 20:
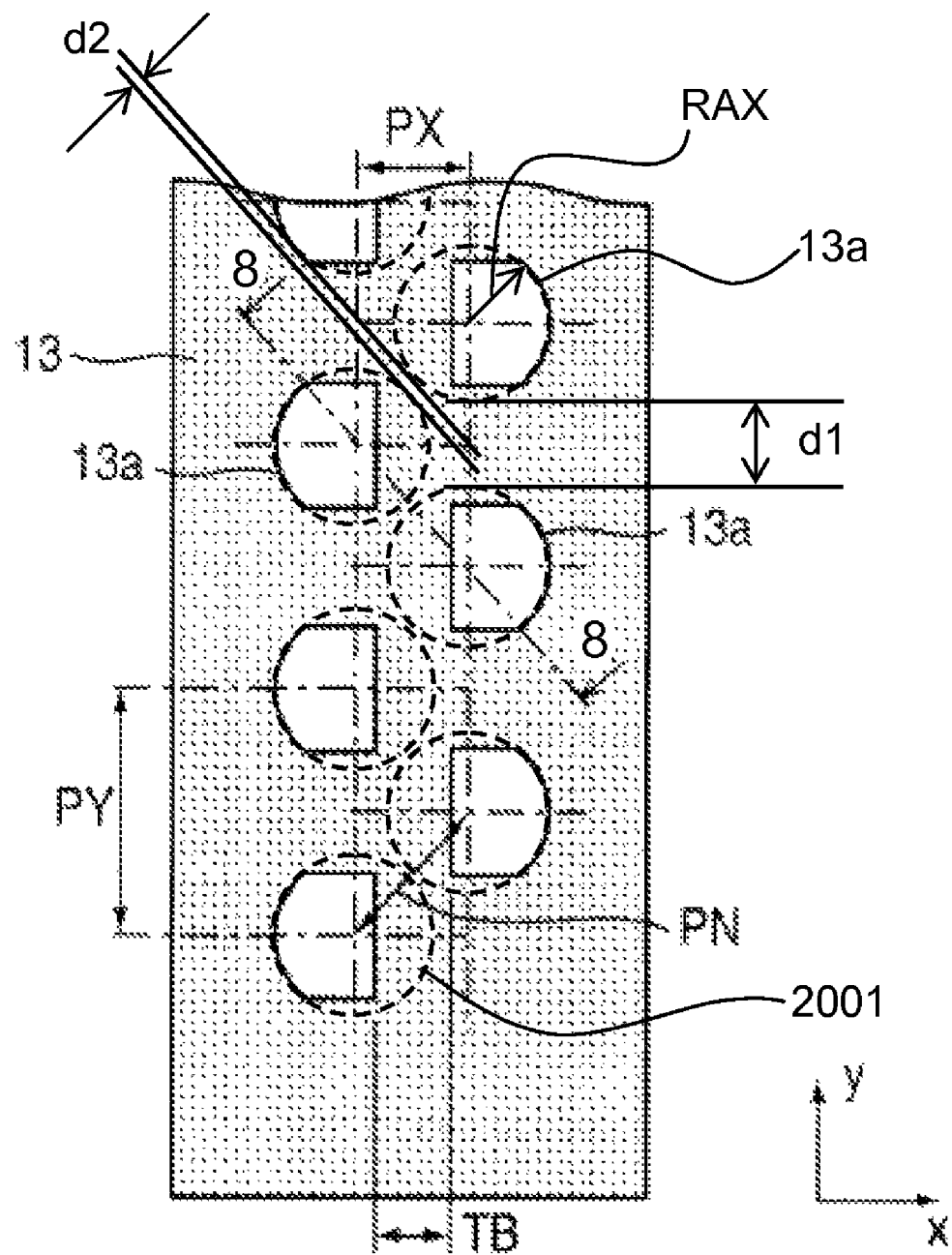
FIG. 20 is a schematic plan view showing the light blocking member of the printer according to the first embodiment of the present invention.

FIG. 20 is a schematic plan view showing the light blocking member 13 of the printer 100 according to the first embodiment of the present invention. As shown FIG. 20, as indicated with a reference numeral 2001, the opening portion 13a has the arc with the radius RAX. Further, the opening portion 13a is away from an adjacent opening portion 13a by a distance d1 and a distance d2.

When the light blocking member 13 having the opening portions 13a corresponding to the optical axes of the micro lenses 12 shown in FIG. 7 is formed, if the distance d1 and the distance d2 are not sufficiently large, it is difficult to effectively block light from an adjacent micro lens 12, thereby making it difficult to obtain high image quality. Further, when the light blocking member 13 is formed using a mold with a resin injection method, if the distance d1 and the distance d2 are not sufficiently large, it is difficult to obtain a good resin flow, thereby making it difficult to mold the light blocking member 13.

To this end, in the embodiment, the opening portion 13a has the shape described above. Accordingly, it is possible to obtain the distance d1 and the distance d2 at a sufficiently large level between the opening portions 13a. As a result, it is possible to effectively block light, thereby obtaining high image quality. Further, it is possible to obtain a good resin flow, thereby improving productivity.

In the embodiment, the optical axis AX1 extends perpendicular to a sheet surface of FIG. 1(b). The distance RAY in the arrangement direction of the opening portions 13a is equal to a distance between the optical axis AX1 and an inner wall of the opening portion 13a in the arrangement direction of the opening portions 13a. The radius RAX in the direction perpendicular to the arrangement direction of the opening portions 13a is equal to a distance between the optical axis AX1 and an inner wall of the light blocking member 13 having the opening portions 13a. Further, the light blocking member 13 is formed of polycarbonate through an injection molding.

Figure 8:
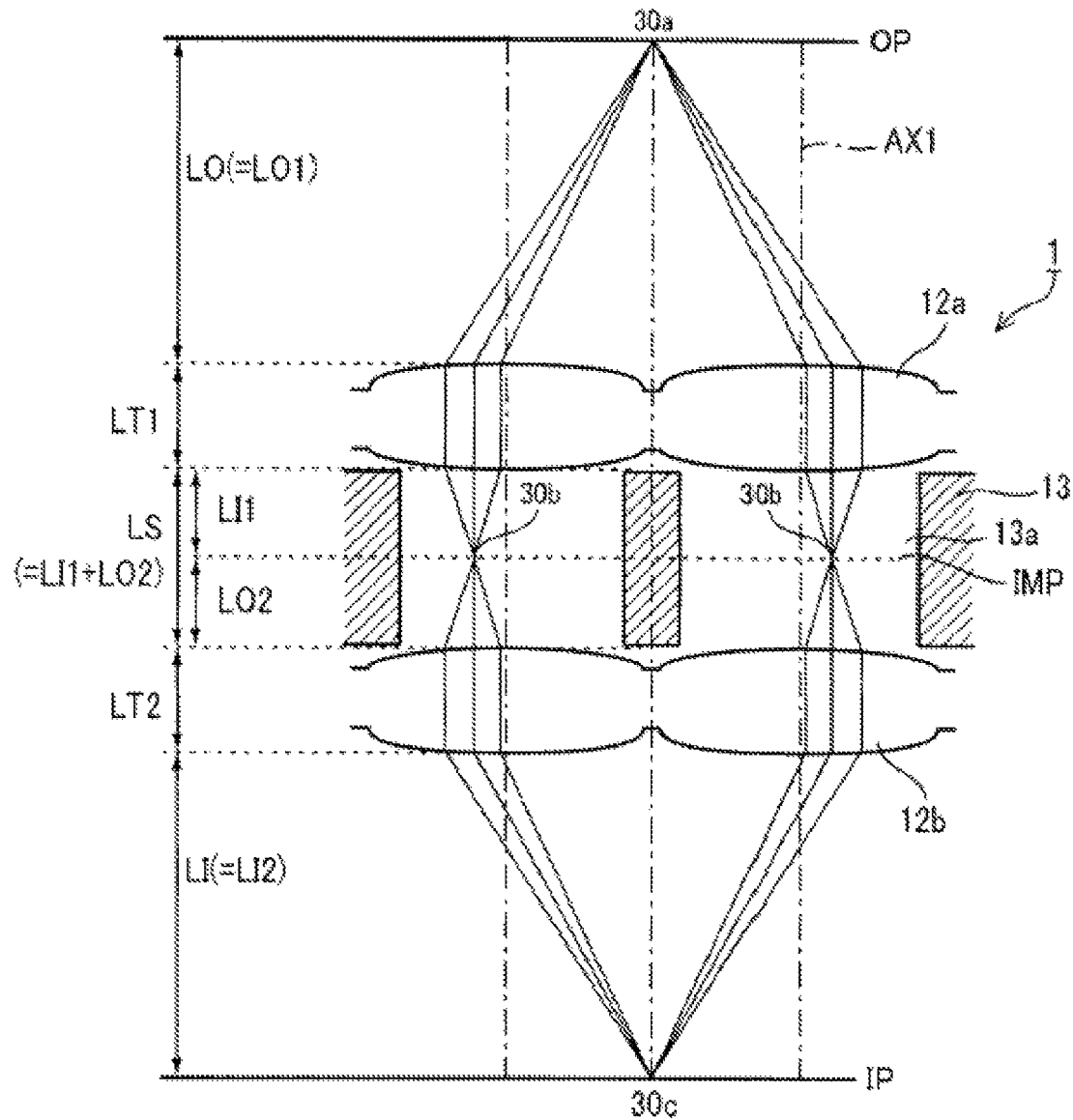
FIG. 8 is a schematic sectional view showing an operation of the lens array taken along a line 8-8 in FIG. 1 and FIG. 7 according to the first embodiment of the present invention.

An operation of the lens array 1 will be explained next with reference to FIG. 8. FIG. 8 is a schematic sectional view showing the operation of the lens array 1 taken along a line 8-8 in FIG. 1 and FIG. 7 according to the first embodiment of the present invention.

As shown in FIG. 8, the lens array 1 with the lens plates 11 has an object plane OP and an image plane IP. FIG. 8 is the schematic sectional view taken along a plane containing the optical axis AX1 of the micro lenses 12 arranged next to with each other.

As shown in FIG. 8, a first micro lens 12a is situated at a position away from the object plane OP of the lens array 1 by a distance LO. A second micro lens 12b is situated away from the first micro lens 12a by a distance LS to face the first micro lens 12a, so that an optical axis of the second micro lens 12b is aligned with an optical axis of the first micro lens 12a. Further, the second micro lens 12b is situated at a position away from the image plane IP of the lens array 1 by a distance LI in an optical axis direction thereof.

In the embodiment, the first micro lens 12a has a thickness LT1, so that the first micro lens 12a forms an image of an object 30a at a distance LO1 in the optical axis direction thereof on an intermediate image plane IMP at a distance LI1 in the optical axis direction thereof as an intermediate image 30b. Further, the second micro lens 12b has a thickness LT2, so that the second micro lens 12b forms a projected image 30c of the intermediate image 30b on the intermediate image plane IMP at a distance LO2 on a plane at a distance LI2 in the optical axis direction thereof.

In the embodiment, the first micro lens 12a is arranged such that the distance LO from the object plane OP of the lens array 1 is equal to the distance LO1. Further, the first micro lens 12a and the second micro lens 12b are arranged such that a distance LS therebetween is equal to a sum of the distance LI1 and the distance LO2 (LS=LI1+LO2). Further, the second micro lens 12b is arranged such that the distance LI to the image plane IP of the lens array 1 is equal to the distance LI2.

In the embodiment, the first micro lens 12a may have a configuration the same as that of the second micro lens 12b. In this case, the first micro lens 12a and the second micro lens 12b both have the thickness LT1, and the distance LO between the object plane OP of the lens array 1 and the first micro lens 12a is equal to the distance LO1. Further, the first micro lens 12a may have a shape with a curved surface on a side of the object plane OP the same as that of the second micro lens 12b on a side of the image plane IP, so that the curved surface of the first micro lens 12a faces that of the second micro lens 12b. In this case, the distance LO2 between the intermediate image plane IMP and the second micro lens 12b is equal to the distance LI1.

In the embodiment, the first micro lens 12a and the second micro lens 12b are arranged such that the distance LS therebetween is equal to two times the distance LI1 (LS=2×LI1). The second micro lens 12b is arranged such that the distance LI to the image plane IP of the lens array 1 is equal to the distance LO1 (LI=LO1).

As described above, in the embodiment, the lens array 1 includes the lens plates 11 sandwiching the light blocking member 13 such that the lens plates 11 face with each other with the opposite sides thereof and are held with the specific interval in between for forming an image on the image plane IP. Further, two of the micro lenses 12 are arranged at symmetry positions with the light blocking member 13 in between such that the optical axes thereof are aligned with each other, thereby constituting an optical system for forming an erected same-size image.

When the optical system is formed of the two of the micro lenses 12 with the optical axes aligned with each other, it is possible to form the erected same-size image of the LED elements 30 on the surface of the photosensitive drum 41. Further, the light blocking member 13 is disposed between the lens plates 11 for blocking stray light (partial light) from other optical system from entering the optical system formed of the two of the micro lenses 12 with the optical axes aligned with each other. Further, the light blocking member 13 blocks light from entering the other optical system.

An operation of the printer 100 will be explained next with reference to FIG. 2. The power source (not shown) applies a voltage to the charging roller 42, so that the charging roller 42 charges the surface of the photosensitive drum 41 of the printer 100. When the photosensitive drum 41 rotates, and the surface of the photosensitive drum 41 thus charged approaches the LED head 3, the LED head 3 exposes the surface of the photosensitive drum 41, thereby forming the static latent image on the surface of the photosensitive drum 41. Then, the developing device 5 develops the static latent image, thereby forming the toner image on the surface of the photosensitive drum 41.

After the sheet supply roller 61 picks up the sheet 101 set in the sheet supply cassette 60, the transport rollers 62 and 63 transport the sheet 101 to the transfer roller 80 and the transfer belt 81. When the photosensitive drum 41 rotates and the toner image on the surface of the photosensitive drum 41 approaches the transfer roller 80 and the transfer belt 81, the transfer roller 80 and the transfer belt 81 with a voltage applied from the power source (not shown) transfer the toner image on the surface of the photosensitive drum 41 to the sheet 101.

After the toner image is transferred to the sheet 101, the transfer belt 81 rotates to transport the sheet 101 to the fixing device 9, so that the fixing device 9 presses and heats the toner image on the sheet 101, thereby fixing the toner image to the sheet 101. After the toner image is fixed to the sheet 101, the transport roller 64 and the discharge roller 65 discharge the sheet 101 to the discharge unit 7, thereby completing the operation of the printer 10.

An operation of the LED head 3 as the exposure device will be explained next with reference to FIG. 4. As shown in FIG. 4, when the control unit of the printer 100 sends a control signal of the LED head 3 according to the image data, the driver ICs 31 control the LED elements 30 to emit light with a specific amount according to the control signal. When the LED elements 30 emit light, light passes through the lens array 1, thereby forming an image on the photosensitive drum 41.

An operation of the lens array 1 will be explained next with reference to FIG. 8. As shown in FIG. 8, when light (the image of the object 30a) emitted from the LED elements 30 passes through the first micro lens 12a, the first micro lens 12a forms the intermediate image 30b on the intermediate image plane IMP at the distance LI1 in the optical axis direction thereof. Then, the second micro lens 12b forms the projected image 30c as the image of the intermediate image 30b on the image plane IP, so that the image of the object 30a is formed on the image plane IP.

In the embodiment, the intermediate image 30b formed with the first micro lens 12a is an inverted reduced image of the object 30a, and the projected image 30c formed with the second micro lens 12b is an inverted enlarged image of the intermediate image 30b. Note that a chief ray of light from each point on the object plane is parallel with each other between the second micro lens 12b and the second micro lens 12b, i.e., telecentric.

In the embodiment, it is supposed that the object 30a has a size SA, the intermediate image 30b has a size SB, and the projected image 30c has a size SC. In this case, a magnification M1 of the first micro lens 12a and a magnification M2 of the second micro lens 12b are given by the following equations, respectively.

$$M1=SB/SA$$

$$M2=SC/SB$$

As described above, the lens array 1 forms an erected same-size image. Accordingly, a magnification MA of the lens array 1 must be one (MA=SC/SA=1, MA=M1×M2=1). In other words, the magnification M2 of the second micro lens 12b must be equal to an inverse number of the magnification M1 of the first micro lens 12a.

In the embodiment, after light emitted from the LED elements 30 passes through the first micro lens 12a, the light blocking member 13 blocks a portion of light not contributing an image formation.

When the first micro lens 12a and the second micro lens 12b have the identical configuration, the lens array 1 forms the erected same-size image of the object 30a. That is, when light emitted from the LED elements 30 passes through the first micro lens 12a as the object 30a, the first micro lens 12a forms the intermediate image 30b on the intermediate image plane IMP at a distance LS/2 in the optical axis direction thereof. Then, the second micro lens 12b forms the projected image 30c as the image of the intermediate image 30b on the image plane IP. At this moment, the projected image 30c is the erected same-size image of the object 30a. Further, the chief ray of light is telecentric between the second micro lens 12b and the second micro lens 12b.

Figure 9:
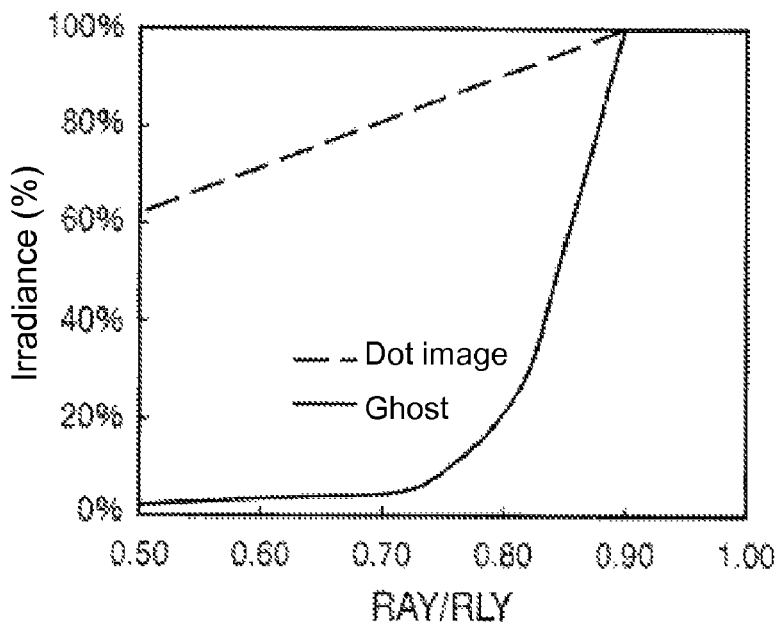
FIG. 9 is a graph showing a relationship between a value of RAY/RLY and irradiance of a dot image and a ghost according to the first embodiment of the present invention.

An operation of the lens array 1 will be explained next with reference to FIG. 9. FIG. 9 is a graph showing a relationship between a value of RAY/RLY and irradiance of a dot image and a ghost according to the first embodiment of the present invention.

An experiment was conducted for establishing the relationship shown in FIG. 9. In the experiment, in the lens array 1, the micro lenses 12 had a constant radius RLY in parallel to the arrangement direction of the micro lenses 12, or a constant distance RLY of the micro lenses 12 in a y direction (refer to FIG. 7). Further, the light blocking member 13 had the opening portions 13a with various radii RAY in parallel to the arrangement direction of the micro lenses 12, or various distances RAY of the opening portions 13a of the light blocking member 13 in a y direction (refer to FIG. 1(b)).

Further, in the experiment, the radius RLX of the micro lenses 12 perpendicular to the arrangement direction of the micro lenses 12, or the distance RLX of the micro lenses 12 in an x direction (refer to FIG. 7) had a constant ratio of 0.9 (RAX/RLX=0.9) with respect to the radius RAX of the opening portions 13a of the light blocking member 13 perpendicular to the arrangement direction of the micro lenses 12, or the distances RAX of the opening portions 13a of the light blocking member 13 in an x direction (refer to FIG. 1(b)).

In the graph shown in FIG. 9, luminescence of the ghost is represented with a solid line. The luminescence of the ghost was represented as a ratio between luminescence df the ghost of the LED elements 30 at a position on the image plane IP away in the arrangement direction of the micro lenses 12 by 3.6 mm from a position where the LED elements 30 emit light when 48 of the LED elements 30 arranged sequentially emitted light, and luminescence of the ghost at the lens array 1 with the constant ratio of 0.9 (RAX/RLX=0.9).

As shown in FIG. 9, in a range of RAY/RLY<0.9 (=RAX/RLX), when the value of RAY/RLY of the lens array 1 decreases, the luminescence of the ghost decreases. When the value of RAY/RLY is equal to or less than 0.75, the luminescence of the ghost shows a significantly small value, and the luminescence of the ghost varies to a small extent with respect to a change in the value of RAY/RLY, thereby exhibiting constant luminescence.

In the graph shown in FIG. 9, luminescence of the dot image is represented with a broken line. The luminescence of the dot image was represented as a ratio between luminescence of the projected image of only one LED element 30 when the LED element 30 emitted light, and luminescence of the dot image at the lens array 1 with the constant ratio of 0.9 (RAX/RLX=0.9).

As shown in FIG. 9, when the value of RAY/RLY of the lens array 1 decreases, the luminescence of the dot image decreases at a rate smaller than that of the change in the luminescence of the ghost. When the value of RAY/RLY is less than 0.50, the luminescence of the dot image decreases significantly. Accordingly, it is preferred that the value of RAY/RLY is equal to or greater than 0.5.

Figure 16:
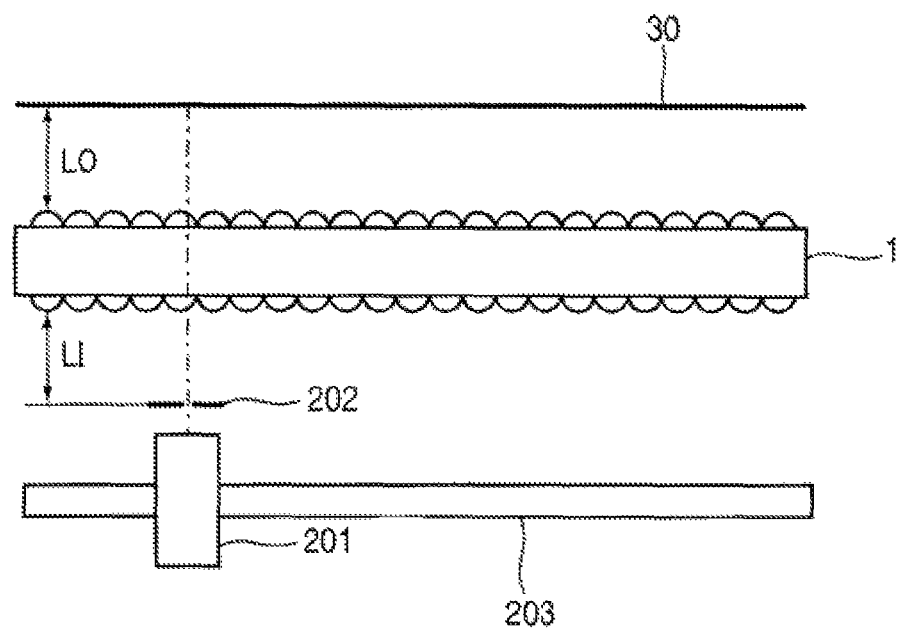
FIG. 16 is a schematic view showing a irradiance measurement device for evaluating the lens array of the printer according to the first embodiment of the present invention.

A irradiance measurement device used for measuring the luminescence of the ghost and the luminescence of the dot image shown in FIG. 9 will be explained next. FIG. 16 is a schematic view showing the irradiance measurement device for evaluating the lens array 1 of the printer 100 according to the first embodiment of the present invention.

As shown in FIG. 16, the irradiance measurement device includes a light receiving element 201, a slit 202, a drive device 203, and a processing unit (not shown) for calculating luminescence from a signal acquired at the light receiving element 201. The LED elements 30 are arranged substantially linearly in parallel to the lens array 1 with a distance LO in between. Further, the lens array 1 is arranged such that the optical axes of the micro lenses 12 are aligned with a vertical direction in FIG. 16.

In the irradiance measurement device, after light passes through the slit 202, the light receiving element 201 receives light and converts light to an electrical signal. The drive device 203 is configured to move the light receiving element 201 and the slit 202 in parallel to the lens array 1. Further, the slit 202 moves while constantly maintaining a distance LI with respect to the lens array 1. When the irradiance measurement device measures luminescence, the light receiving element 201 and the slit 202 move to a position symmetry to the LED element 30 with the lens array 1 as a symmetry axis. When the irradiance measurement device measures the ghost, the light receiving element 201 and the slit 202 move to a position where the ghost occurs.

An experiment for measuring MTF (Modulation Transfer Function) of the LED head 3 with the lens array 1 will be explained next. The MTF indicates a resolution of a projected image, a resolution of a developing device, or a contrast of a projected image of the LED element 30 emitting light in the developing device. When the MTF is 100%, the contrast of the projected image is at a maximum level, thereby indicating a high resolution of the developing device. When the MTF decreases, the contrast of the projected image decreases, thereby indicating a lower resolution of the developing device.

In the experiment, the MTF is defined as follows:

$$MTF(\%) = (EMAX - EMIN)/(EMAX + EMIN) \times 100$$

where EMAX is a maximum value of a light amount of a projected image, and EMIN is a minimum value of a light amount between two projected images situated next to each other.

In the experiment for measuring the MTF, a microscope digital camera captured an image on the image plane IP of the lens array 1 of the LED head 3 at a position away from a top of the curved surface of the second micro lens 12b on the side of the image plane by a distance LI (mm). A distribution of the light amount of the projected image of the LED element 300 was analyzed in the captured image, thereby calculating the MTF. In the experiment, the LED head 3 with the LED elements 30 arranged at an arrangement interval PD of 0.0423 mm was used.

Figure 10:
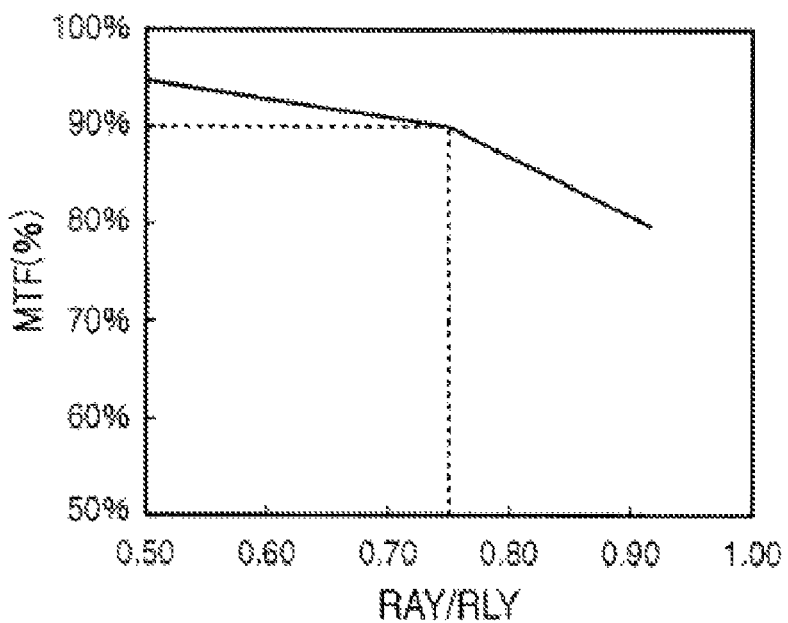
FIG. 10 is a graph showing a relationship between a value of RAY/RLY and MTF (Modulation Transfer Function) according to the first embodiment of the present invention.

FIG. 10 is a graph showing a relationship between the value of RAY/RLY and the MTF (Modulation Transfer Function) according to the first embodiment of the present invention.

In the experiment to establish the relationship shown in FIG. 10, in the lens array 1, the micro lenses 12 had the constant distance RLY in the y direction (refer to FIG. 7), and the light blocking member 13 had the opening portions 13a with the various radii RAY in the y direction (refer to FIG. 1(b)). Further, the distance RLX of the micro lenses 12 in the x direction (refer to FIG. 7) had the constant ratio of 0.9 (RAX/RLX=0.9) with respect to the distances RAX of the opening portions 13a of the light blocking member 13 in the x direction (refer to FIG. 1(b)).

As shown in FIG. 10, in the range of RAY/RLY<0.9 (=RAX/RLX), the MTF is greater than 80%. When the value of RAY/RLY of the lens array 1 decreases, the MTF increases. When the value of RAY/RLY is equal to or less than 0.75, the MTF shows a significantly large value, and the MTF varies to a small extent with respect to a change in the value of RAY/RLY, thereby exhibiting constant MTF.

In the embodiment, the LED elements 30 are arranged in the arrangement direction or the y direction in FIG. 1(a). In order to prevent the ghost, it is necessary to arrange the opening portions 13a of the light blocking member 13 at specific positions with respect to the micro lenses 12 in the y direction. On the other hand, the ghost tends not to occur in the x direction in FIG. 1(a), i.e., a direction other than the arrangement direction of the LED elements 30. Accordingly, it is preferred that the opening portions 13a have a size in the x direction larger than that thereof in the y direction in view of the luminescence ratio of the dot image.

In the embodiment, the value of the MTF is correlated to image quality of the printer 100 as follows. In general, when an image forming apparatus forms an image, it is necessary to have a sufficiently high potential in a static latent image in a portion where toner is not attached. When the MTF has a small value, an LED head may irradiate light on a portion of a projected image necessary to become a dark portion.

When the LED head irradiates light on a portion of the static latent image, a potential of the portion, where needs to have a high potential, decreases. Accordingly, when the image forming apparatus forms an image, toner may be attached to the portion, where toner is not supposed to attach. When toner is not attached to a portion of an image formed with an image forming apparatus, the portion is supposed to be a white portion, i.e., a color of a sheet. When toner is attached to the portion to become the white portion, however, the portion is smeared with color of toner, thereby deteriorating image quality of the image forming apparatus.

In the embodiment, it is found that when the MTF is greater than 80%, it is possible to form a high quality image without a streak or a density variance. As explained above with reference to FIGS. 9 and 10, when the lens array 1 is configured such that the following relationship is established, it is possible to reduce the ghost and obtain the value of the MTF greater than 80%, thereby forming a high quality image with the printer 100.

$$RAY/RLY > RAX/RLX$$

where RAY is the distance of the opening portion 13a of the light blocking member 13 in the y direction, RLY is the distance of the micro lens 12 in the y direction, RAX is the distance of the opening portion 13a of the light blocking member 13 in the x direction, and RLX is the distance of the micro lens 12 in the x direction. Further, when the value of RAY/RLY is equal to or greater than 0.5 and equal to or less than 0.75 ($0.5 \leq RAY/RLY \leq 0.75$), it is possible to obtain the dot image with sufficiently high luminescence, thereby forming a high quality image with the printer 100.

Figure 11:
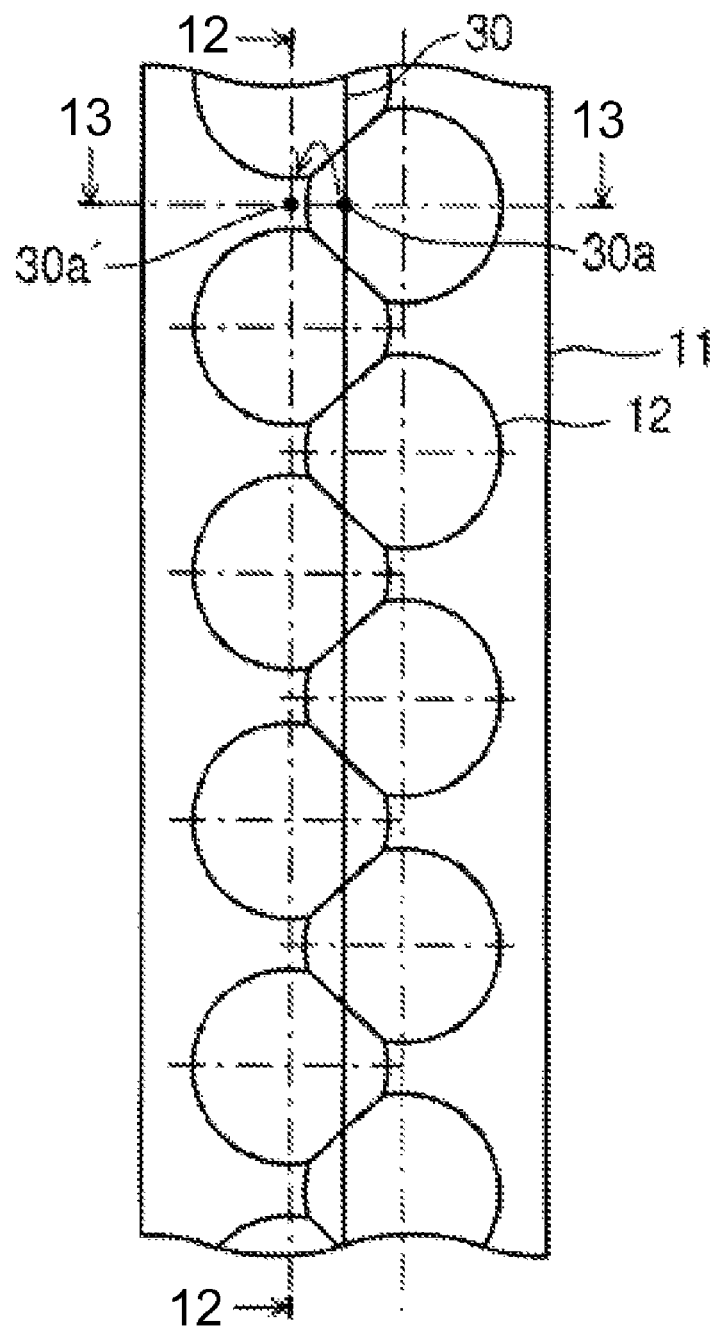
FIG. 11 is a schematic plan view showing an LED (Light Emitting Diode) head of the printer according to the first embodiment of the present invention.

An operation of the lens array 1 will be explained next with reference to FIGS. 11, 12 and 13. FIG. 11 is a schematic plan view showing the LED (Light Emitting Diode) head 3 of the printer 100 according to the first embodiment of the present invention. FIG. 11 shows the LED elements 30 and the lens array 1 viewed from a z direction in FIG. 4. In FIG. 11, the LED elements 30 and the micro lenses 12 are arranged in a vertical direction. It is supposed that one point of the LED element 30 corresponds to the object 30a.

Figure 12:
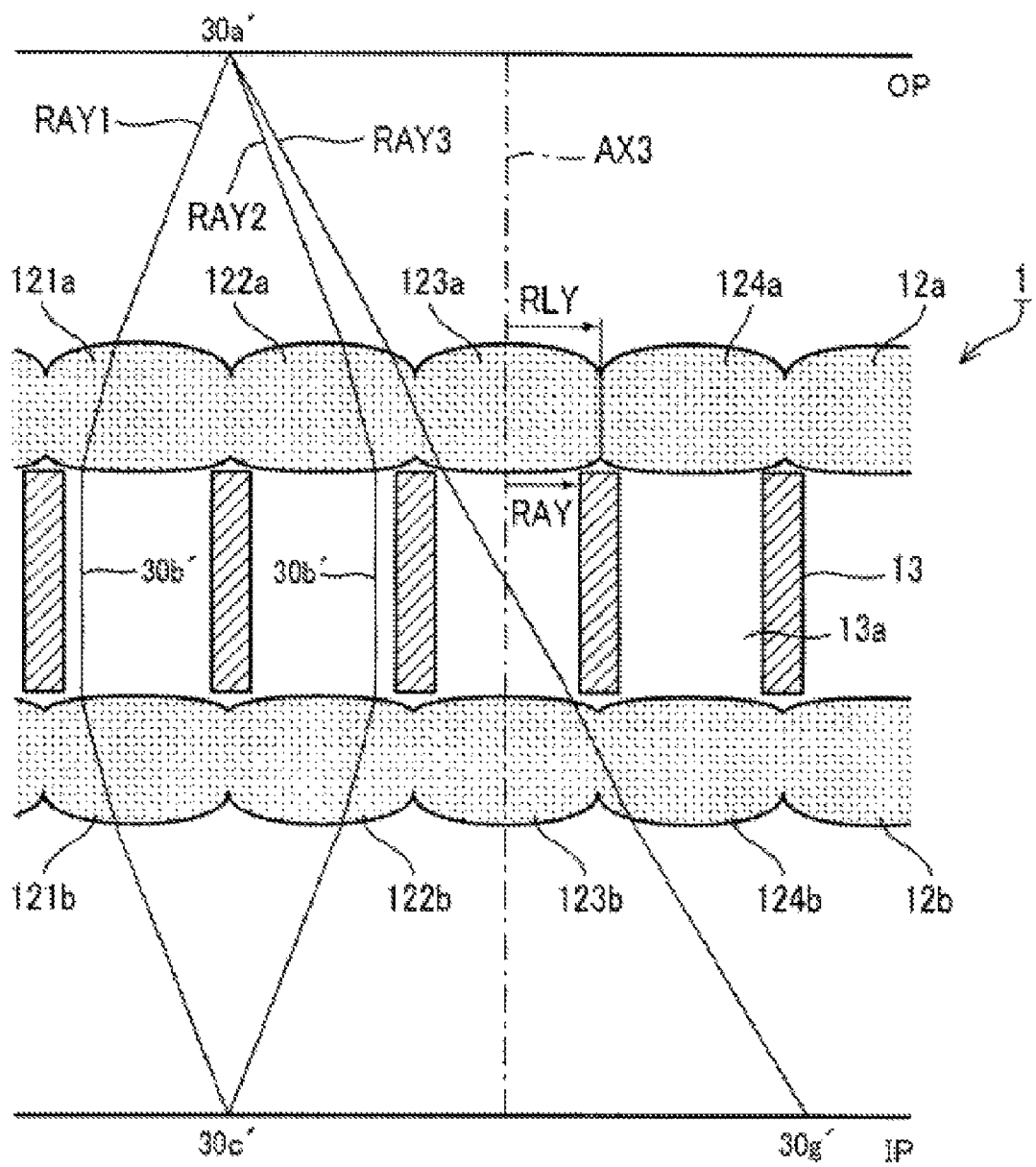
FIG. 12 is a schematic sectional view showing the lens array taken along a line 12-12 in FIG. 11 according to the first embodiment of the present invention.

FIG. 12 is a schematic sectional view showing the lens array 1 taken along a line 12-12 in FIG. 11 according to the first embodiment of the present invention. In FIG. 12, the micro lenses 12 are arranged in a lateral direction, and the optical axes of the micro lenses 12 are aligned with a vertical direction.

A component of a light ray emitted from the object 30a in the arrangement direction of the micro lenses 12 will be explained next with reference to FIG. 12. In FIG. 12, the object 30a corresponds to an object 30a' shifted to a position of the line 12-12 in FIG. 11 in a direction perpendicular to the arrangement direction of the micro lenses 12.

As shown in FIG. 12, a light ray RAY1 and a light ray RAY2 emitted from the object 30a' are incident on a first micro lens 121a and a first micro lens 122a, thereby forming an intermediate image 30b'. Further, a second micro lens 121b and a second micro lens 122b form a projected image 30c' on the image plane IP. Note that the light ray RAY1 and the light ray RAY2a correspond to chief rays of light constituting the projected image 30c'. Further, in the opening portions 13a, the light ray RAY1 and the light ray RAY2a are parallel to the optical axis of the first micro lens 121a, i.e., telecentric.

On the other hand, a light ray RAY3 emitted from the object 30a' is incident on the first micro lens 122a. However, the light ray RAY3 is not emitted from a lens surface of the first micro lens 122a on the side of the image plane IP, instead from a lens surface of a first micro lens 123a adjacent to the first micro lens 122a on the side of the image plane IP. Accordingly, in the opening portion 13a, the light ray RAY3 is not parallel to the optical axis of the first micro lens 122a.

Further, the light ray RAY3 is incident on the second micro lens 123b. However, the light ray RAY3 is not emitted from a lens surface of the second micro lens 123b on the side of the image plane IP, instead from a lens surface of a second micro lens 124b adjacent to the second micro lens 123b on the side of the image plane IP. Accordingly, the light ray RAY3 is incident on the image plane to form a ghost 30g.

As described above, the object 30a' is located far from an optical axis AX3 of the first micro lens 123a. The light ray RAY3 emitted from the object 30a' is incident on and leaks from the first micro lens 122a, and is incident on the first micro lens 123a adjacent to the first micro lens 122a. Accordingly, the light ray RAY3 is shifted from a standard optical path, and forms an image different from a projected image of the object 30c', i.e., the ghost 30g', without being blocked by the light blocking member 13.

Further, the lens array 1 is configured to form the erected same-size image. Accordingly, the projected image of the object 30a' is supposed to be formed at the position of the image 30c' in point symmetry with the lens array 1 as the symmetry axis. However, the ghost 30g' is formed at a position far away from the image 30c' along the arrangement direction of the micro lenses 12.

Figure 13:
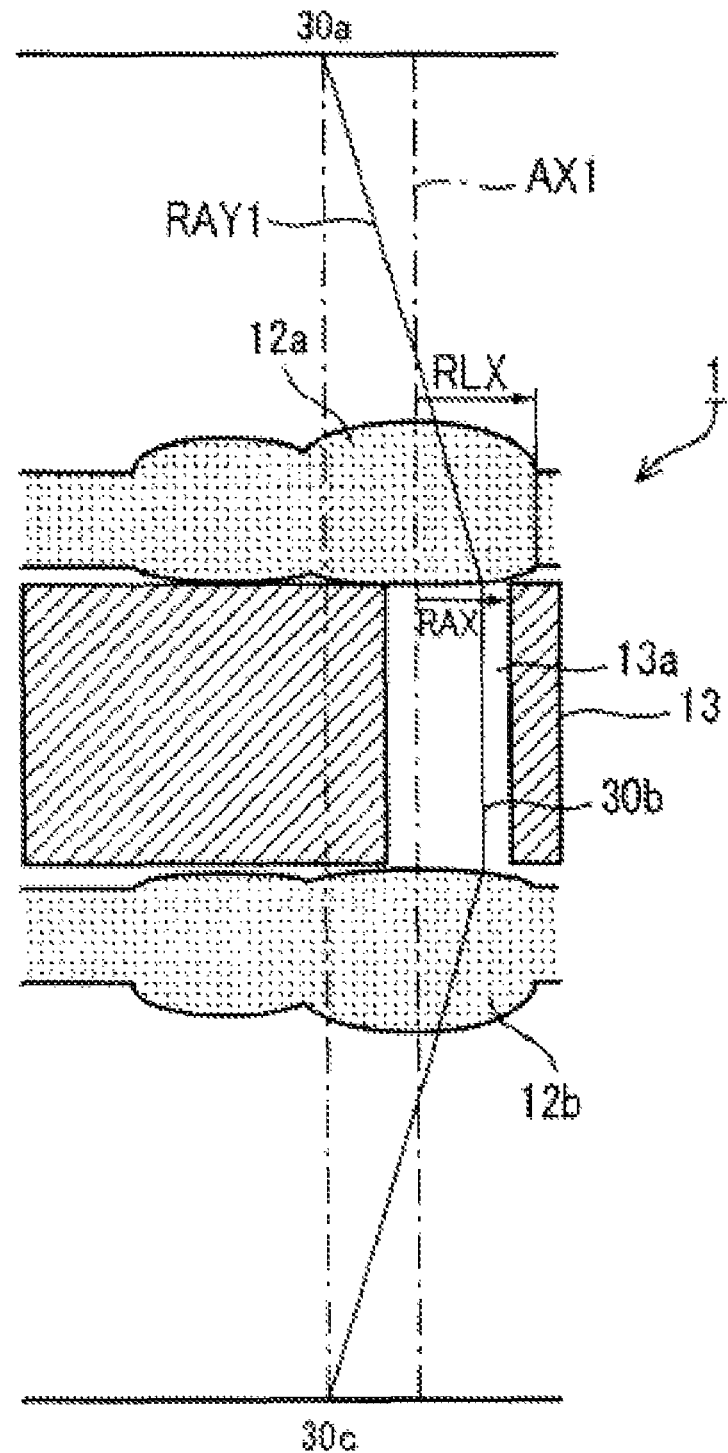
FIG. 13 is a schematic sectional view showing the lens array taken along a line 13-13 in FIG. 11 according to the first embodiment of the present invention.

FIG. 13 is a schematic sectional view showing the lens array 1 taken along a line 13-13 in FIG. 11 according to the first embodiment of the present invention. In FIG. 13, the optical axes of the micro lenses 12 are aligned with a vertical direction.

As shown in FIG. 13, the light ray RAY1 emitted from the object 30a is incident on the first micro lens 12a, thereby forming the intermediate image 30b. Further, the second micro lens 12b forms the projected image 30c on the image plane IP. Note that the light ray RAY1 corresponds to the chief ray of light constituting the projected image 30c. In this case, there is no LED element (the object 30a) at a position far away from the optical axis AX1 of the micro lenses 12 in the direction perpendicular to the arrangement direction of the micro lenses 12, thereby forming no ghost.

As shown in FIG. 12, in the opening portion 13a, the light ray RAY1 and the light ray RAY2 from the object 30a' are parallel to the optical axes of the micro lenses 12. However, the light ray RAY3 passes obliquely through the opening portion 13a, thereby forming the ghost 30g'. Accordingly, when the distance RAY as the radius of the opening portion 13a in the arrangement direction of the micro lenses 12 decreases, the light ray RAY3 is blocked, thereby reducing luminescence of the ghost 30g'.

As described above, when the radius of the opening portion 13a decreases, luminescence of the projected image decreases. In the embodiment, the radius RAY of the micro lenses 12 in the arrangement direction of the micro lenses 12 is smaller than the radius RAX of the opening portions 13a not associated with the ghost in the direction perpendicular to the arrangement direction of the micro lenses 12. Accordingly, it is possible to reduce luminescence of the ghost while minimizing the reduction in luminescence of the projected image, thereby increasing the resolution of the lens array 1.

Figure 14:
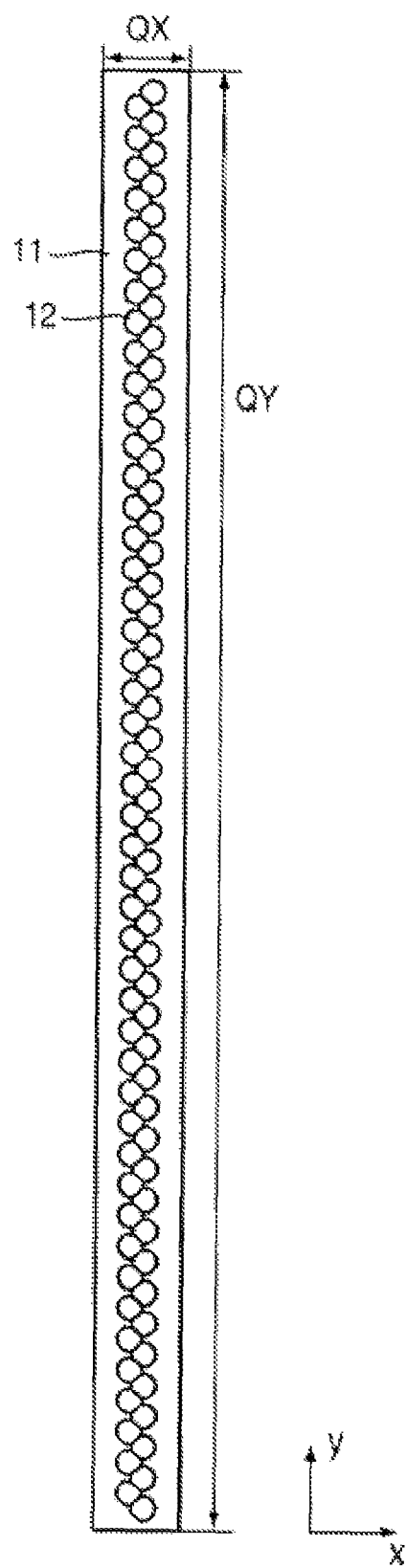
FIG. 14 is a schematic plan view showing a lens plate of the lens array according to the first embodiment of the present invention.

A dimension of the lens plate 11 of the lens array 1 will be explained next. FIG. 14 is a schematic plan view showing the lens plate 11 of the lens array 1 according to the first embodiment of the present invention.

As described above, the micro lenses 12 arranged in the first lens row 14a and the second lens row 14b are separated by the distance PY (refer to FIG. 7). The first lens row 14a and the second lens row 14b are separated by the distance PX (refer to FIG. 7). Further, as shown in FIG. 14, the lens plate 11 has a length QY in the arrangement direction of the micro lenses 12 and a length QX in a direction perpendicular to the arrangement direction of the micro lenses 12.

Table 1 shows dimensions of the distance PY, the distance PX, the length QY, the length QY, and the radius RL of the micro lenses 12. Further, Table 1 shows dimensions of a metal mold corresponding to the distance PY, the distance PX, the length QY, the length QY, and the radius RL for forming the lens plate 11 of the lens array 1.

TABLE 1

|    | Part dimension (mm) | Mold dimension (mm) |
|----|---------------------|---------------------|
| PX | 0.4                 | 0.402               |
| PY | 1.2                 | 1.206               |
| QX | 5.802               | 5.829               |
| QY | 333                 | 334.665             |
| RL | 0.5                 | 0.5025              |

In the embodiment, the lens plate 11 of the lens array 1 has a shrinkage of 99.5025% in a longitudinal direction thereof (333 mm/334.665 mm×100%=99.5025%).

In the embodiment, each of the micro lenses 12 of the lens plate 11 on the side of the object has a surface on the metal mold corresponding to a surface thereof on the side of the object, and has a sectional shape in the longitudinal direction thereof (the y direction in FIG. 1 and FIG. 7) expressed with the following equation (2).

$$Z(Y) = \frac{\frac{Y^2}{(CY)}}{1 + \sqrt{1 - \left(\frac{Y}{(CY)}\right)^2}} + (AY)Y^4 + (BY)Y^6 \qquad (2)$$

where Y is a distance from a point of the metal mold corresponding to a top of the lens surface of the micro lens 12, CY is a curvature radius in the longitudinal direction shown in Table 2, AY is a fourth order aspheric surface coefficient in the longitudinal direction shown in Table 2, and BY is a sixth order aspheric surface coefficient in the longitudinal direction shown in Table 2.

Further, each of the micro lenses 12 of the lens plate 11 on the side of the object has a surface on the metal mold corresponding to a surface thereof on the side of the object, and has a sectional shape in the width direction thereof (the x direction in FIG. 1 and FIG. 7) expressed with the following equation (3).

$$Z(X) = \frac{\frac{X^2}{(CX)}}{1 + \sqrt{1 - \left(\frac{X}{CX}\right)^2}} + (AX)X^4 + (BX)X^6 \quad (3)$$

where X is a distance from a point of the metal mold corresponding to a top of the lens surface of the micro lens 12, CX is a curvature radius in the width direction shown in Table 2, AX is a fourth order aspheric surface coefficient in the width direction shown in Table 3, and BX is a sixth order aspheric surface coefficient in the width direction shown in Table 3.

In the embodiment, each of the micro lenses 12 of the lens plate 11 on the side of the image plane has a surface on the metal mold corresponding to a surface thereof on the side of the image plane, and has a sectional shape in the longitudinal direction thereof (the y direction in FIG. 1 and FIG. 7) expressed with the following equation (2).

In the equation (2), Y is the distance from a point of the metal mold corresponding to a top of the lens surface of the micro lens 12, CY is a curvature radius in the longitudinal direction shown in Table 3, AY is a fourth order aspheric surface coefficient in the longitudinal direction shown in Table 3, and BY is a sixth order aspheric surface coefficient in the longitudinal direction shown in Table 3.

In the embodiment, each of the micro lenses 12 of the lens plate 11 on the side of the image plane has a surface on the metal mold corresponding to a surface thereof on the side of the image plane, and has a sectional shape in the width direction thereof (the x direction in FIG. 1 and FIG. 7) expressed with the following equation (3).

In the equation (3), Y is the distance from a point of the metal mold corresponding to a top of the lens surface of the micro lens 12, CY is a curvature radius in the width direction shown in Table 2, AY is a fourth order aspheric surface coefficient in the width direction shown in Table 3, and BY is a sixth order aspheric surface coefficient in the width direction shown in Table 3.

TABLE 2

| Coefficient | Longitudinal direction | Coefficient | Width direction |
|---|---|---|---|
| CY | 0.68072 | CX | 0.68072 |
| AY | −0.29886 | AX | −0.29886 |
| BY | −0.42664 | BX | −0.38785 |

TABLE 3

| Coefficient | Longitudinal direction | Coefficient | Width direction |
|---|---|---|---|
| CY | −1.50165 | CX | −1.50165 |
| AY | 0.553 | AX | 0.553 |
| BY | 2.08222 | BX | 2.12039 |

Figure 15:
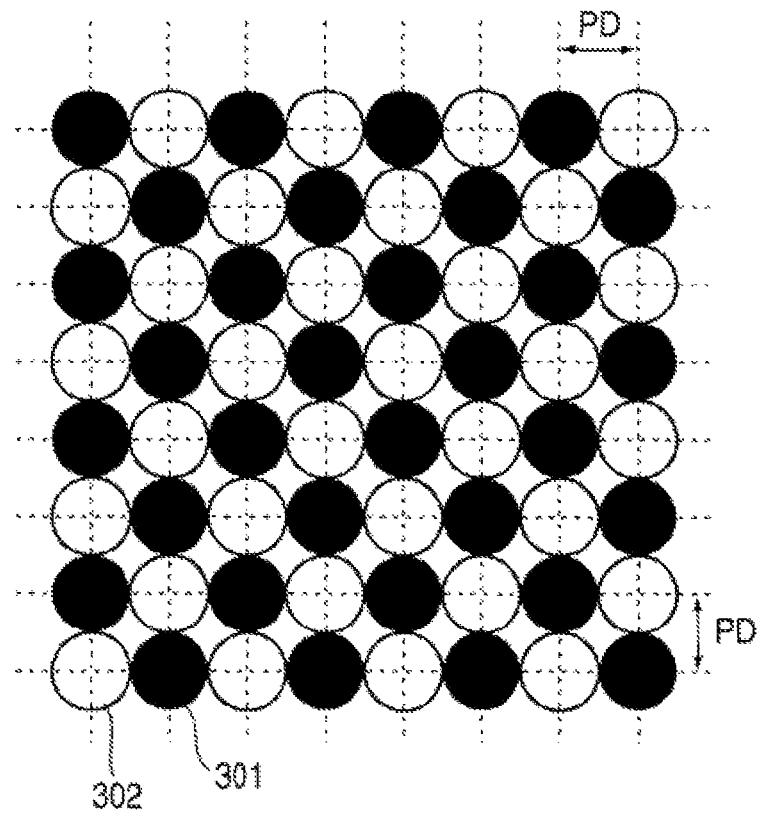
FIG. 15 is a schematic view showing an image used for evaluating the lens array of the printer according to the first embodiment of the present invention.

An experiment was conducted for evaluating an image of an image forming apparatus provided with the lens array 1 using a color LED printer. FIG. 15 is a schematic view showing an image used for evaluating the lens array 1 of the printer 100 according to the first embodiment of the present invention. The image contained alternate dots among all dots. More specifically, toner was attached to dots 301, and toner was not attached to dots 302. In the experiment, the image shown in FIG. 15 was formed on an entire print area, thereby evaluating the image.

As described above, in the embodiment, each of the micro lenses 12 has the rotationally symmetrical high order aspheric surface, and may have a curved surface such as a spherical surface, an anamorphic aspheric surface, a parabolic surface, an oval surface, a hyperbolic surface, a Korenich surface, and the like.

In the embodiment, the lens plate 11 is molded through the injection molding, and may be formed through other molding method such as a compression injection molding. Further, the lens plate 11 is formed of a resin, and may be formed of glass.

Further, in the embodiment, the light blocking member 13 is formed of polycarbonate through the injection molding, and may be formed through machining or etching a metal plate. Further, the LED array is formed of a plurality of the LED elements 30 as the light emitting portions, and may be formed of organic EL as light emitting portions or semiconductor lasers. Further, the exposure device may includes a shutter formed of a liquid crystal element provided in a light emitting portion formed of a fluorescent lamp, a halogen lamp, and the like.

As explained above, in the embodiment, the lens array 1 is configured such that the following relationship is established.

RAY/RLY>RAX/RLX where RAY is the distance of the opening portion 13*a* of the light blocking member 13 in the y direction, RLY is the distance of the micro lens 12 in the y direction, RAX is the distance of the opening portion 13*a* of the light blocking member 13 in the x direction, and RLX is the distance of the micro lens 12 in the x direction. Further, the value of RAY/RLY is equal to or greater than 0.5 and equal to or less than 0.75 (0.5≦RAY/RLY≦0.75). Accordingly, it is possible to prevent the light ray from leaking from the micro lens and being incident on another micro lens, thereby improving image quality and increasing resolution. When the exposure device uses the lens array 1, it is possible to obtain an image with high contrast, thereby making it possible to form a high quality image with the image forming apparatus.

Second Embodiment

A second embodiment of the present invention will be explained next. In the first embodiment, the lens array 1 is applied to the printer as the image forming apparatus. In the second embodiment, the lens array 1 is applied to a reading apparatus 500. Components in the second embodiment similar to those in the first embodiment are designated with the same reference numerals, and explanations thereof are omitted.

Figure 17:
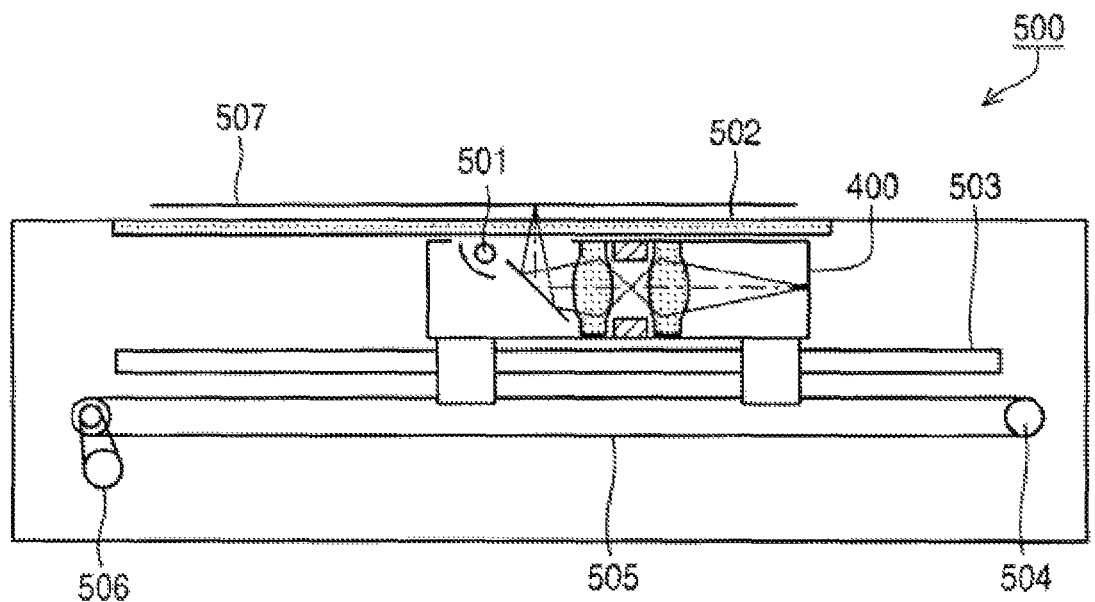
FIG. 17 is a schematic plan view showing a configuration of a reading apparatus according to a second embodiment of the present invention.

FIG. 17 is a schematic plan view showing a configuration of the reading apparatus 500 according to the second embodiment of the present invention. In the embodiment, the reading apparatus 500 is a scanner for reading an original and creating electric data as image data.

As shown in FIG. 11, the reading apparatus 500 includes a reading head 400, a lamp 501, an original table 502, a rail 503, a drive belt 505, a motor 506, and the like. In the embodiment, the lamp 501 as a lighting device irradiates an original 507. The reading head 400 receives light reflected on a surface of the original 507, and converts light to electric data. The lamp 501 is arranged so that light reflected on the surface of the original 507 is incident on the reading head 400.

In the embodiment, the original table 502 is provided for placing the original for creating the electric data. The original table 502 is formed of a material transparent relative to visible light. The rail 503 is disposed below the original table 502 for moving the reading head 400. The reading head 400 is attached to the drive belt 505 extended with a pulley 504, so that the reading head 400 moves on the rail 503 when the motor 506 drives the drive belt 505.

Figure 18:
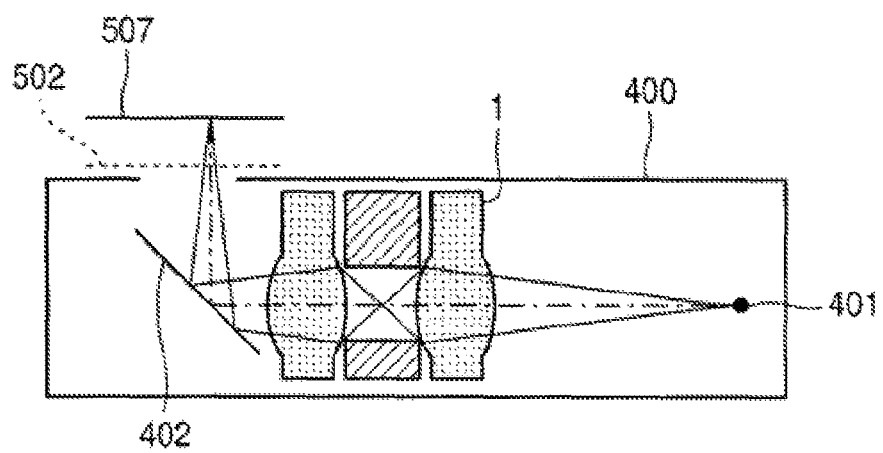
FIG. 18 is a schematic sectional views showing a configuration of a reading head of the reading apparatus according to the second embodiment of the present invention.

A configuration of the reading head 400 will be explained next with reference to FIG. 18. FIG. 18 is a schematic sectional views showing the configuration of the reading head 400 of the reading apparatus 500 according to the second embodiment of the present invention.

As shown in FIG. 18, the reading head 400 includes the lens array 1, a line sensor 401 and a mirror 402. The mirror 402 is provided for bending an optical path of light reflected from the original 507, so that a light ray is incident on the lens array 1. The line sensor 401 includes a plurality of light receiving elements arranged linearly with an interval PR for converting the image of the original 507 formed with the lens array 1 to an electric signal.

Figure 19:
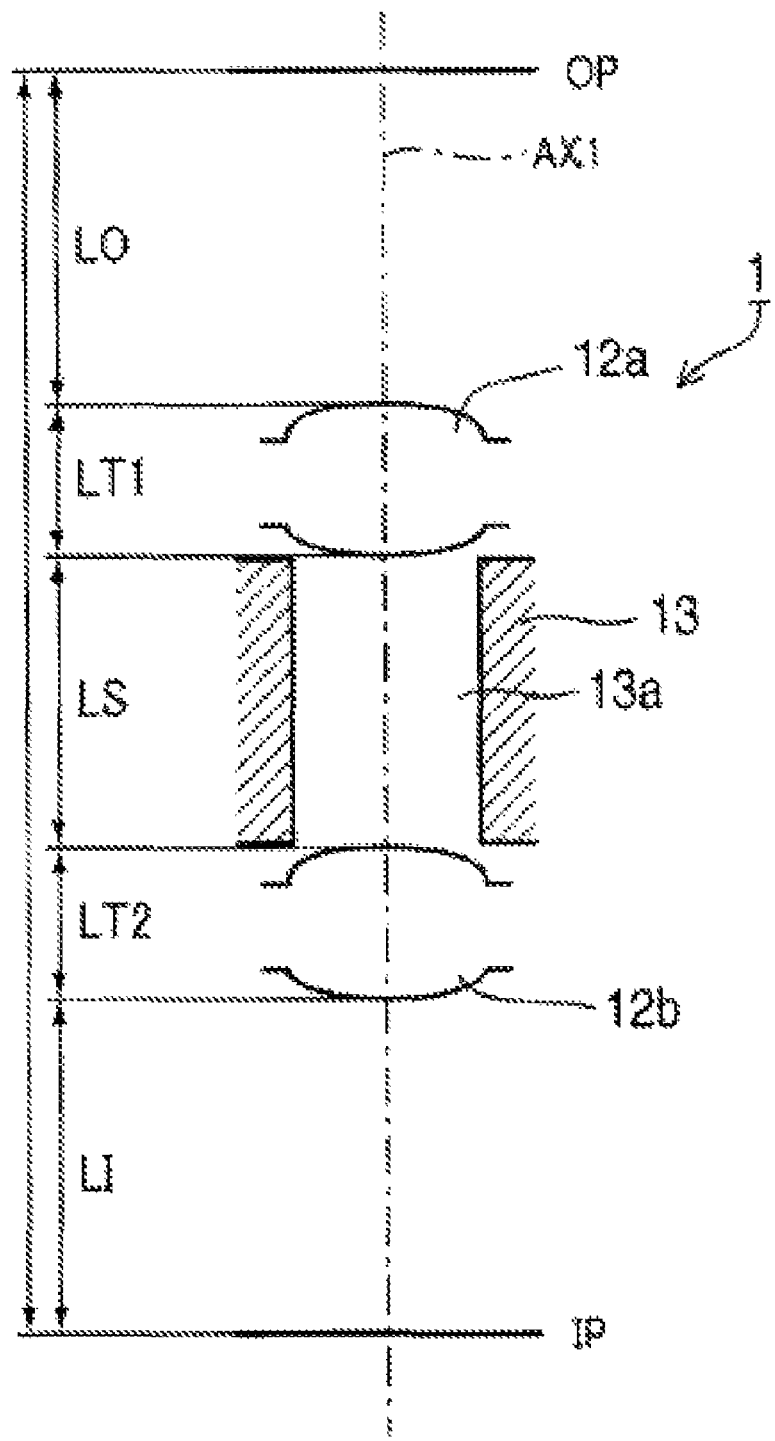
FIG. 19 is a schematic view showing an operation of the reading head of the reading apparatus according to the second embodiment of the present invention.

FIG. 19 is a schematic view showing an operation of the reading head 400 of the reading apparatus 500 according to the second embodiment of the present invention. As shown in FIG. 19, the reading head 400 is arranged to have the object plane OP (the original 507) and the image plane IP. The lens array 1 of the reading apparatus 500 has an identical configuration to that in the first embodiment.

In the embodiment, the line sensor 401 has a resolution of 600 dpi, that is, 600 of the light receiving elements are arranged per one inch with an interval of 0.0423 mm.

An operation of the reaming apparatus 500 will be explained with reference to FIG. 17. When the lamp 501 is turned on and irradiates the original 507, the reading head 400 receives light reflected at the surface of the original 507. When the motor 506 drives the drive belt 505, the reading head 400 and the lamp 501 move laterally in FIG. 17, so that the reading head 400 receives light reflected from an entire surface of the original 507.

An operation of the reading head 400 will be explained next with reference to FIG. 18. As shown in FIG. 18, light reflected at the surface of the original 507 passes through the original table 502, and the mirror 402 bends the optical path of light, so that the lens array 1 receives light. Accordingly, the lens array 1 forms the image of the original 507 on the line sensor 401, so that the line sensor 401 converts the image of the original 507 to the electrical signal, thereby creating electrical data.

An evaluation of the reaming apparatus 500 with the lens array 1 was conducted. In the evaluation, it was possible to obtain image data with high quality similar to that of the original 507. In the evaluation, the reading apparatus 500 formed the image at the resolution of 600 dpi having the pattern shown in FIG. 15, in which the dots are arranged with the interval PD of 0.0423 mm. More specifically, among the dots arranged with the interval PD of 0.0423 mm at the resolution of 600 dpi, the dots are alternately formed over the entire print area of the medium.

In the embodiments described above, the scanner is explained as the reading apparatus for converting the image of the original to the electric data. The reading apparatus may include a sensor or a switch for converting an optical signal to an electrical signal, or an input/output device, a biometric identification device, a communication device, a dimension measurement device and the like using the sensor or the switch.

As described above, in the second embodiment, it is possible to obtain the effect similar to that in the first embodiment. That is, it is possible to obtain the image data similar to the original.

The disclosure of Japanese Patent Application No. 2009-025771, filed on Feb. 6, 2009, is incorporated in the application by reference.

While the invention has been explained with reference to the specific embodiments of the invention, the explanation is illustrative and the invention is limited only by the appended claims.

What is claimed is:

1. A lens array comprising:
   a lens assembly member including a plurality of lens elements arranged in a row extending in a first direction substantially perpendicular to optical axes thereof; and
   a light blocking member including a plurality of apertures arranged in a second direction substantially perpendicular to the optical axes so that the optical axes pass through the apertures, each of said apertures being formed in a shape defined with at least two straight parallel lines,
   wherein said lens assembly member and said light blocking member are arranged so that the following relationship is satisfied:

$$RAY/RLY < RAX/RLX$$

where RLY is a radius of the lens elements in a third direction parallel to the first direction, RLX is a radius of the lens elements in a fourth direction perpendicular to the first direction, RAX is a radius of the aperture in a fifth direction perpendicular to the first direction, and RAY is a distance from a center of a circle with the radius RAX to one of the two straight parallel lines in a sixth direction in parallel to the first direction.

2. The lens array according to claim 1, wherein said lens assembly member and said light blocking member are arranged so that the following relationship is satisfied:

$$RAY/RLY \leq 0.75.$$

3. The lens array according to claim 1, wherein said lens assembly member and said light blocking member are arranged so that the following relationship is satisfied:

$$0.50 \leq RAY/RLY \leq 0.75.$$

4. The lens array according to claim 1, wherein each of said apertures is formed in the shape including an arc portion having the radius RAX.

5. The lens array according to claim 1, wherein each of said two straight parallel lines is situated on a side of an adjacent aperture.

6. An LED (Light Emitting Diode) head comprising the lens array according to claim 1.

7. An exposure device comprising the lens array according to claim 1.

8. An image forming apparatus comprising the lens array according to claim 1.

9. An image reading apparatus comprising the lens array according to claim 1.

10. A lens array comprising:
    a lens assembly member including a plurality of lens elements arranged in a row extending in a first direction substantially perpendicular to optical axes thereof; and
    a light blocking member including a plurality of apertures arranged in a second direction substantially perpendicular to the optical axes so that the optical axes pass through the apertures,
    wherein each of said apertures is formed in a shape including an arc portion having a specific radius, a first straight line portion extending in parallel to the second direction, and a second straight line portion extending perpendicularly to the second direction.

11. An LED (Light Emitting Diode) head comprising the lens array according to claim 10.

12. An exposure device comprising the lens array according to claim 10.

13. An image forming apparatus comprising the lens array according to claim 10.

14. An image reading apparatus comprising the lens array according to claim 10.

* * * * *